United States Patent
Mimura et al.

(10) Patent No.: US 11,728,100 B2
(45) Date of Patent: Aug. 15, 2023

(54) POLYOLEFIN POROUS FILM, SEPARATOR FOR ENERGY STORAGE DEVICE, AND ENERGY STORAGE DEVICE

(71) Applicant: UBE CORPORATION, Ube (JP)

(72) Inventors: Takanobu Mimura, Sakai (JP); Ryou Sakimoto, Sakai (JP)

(73) Assignee: UBE CORPORATION, Ube (JP)

( * ) Notice: Subject to any disclaimer, the term of this patent is extended or adjusted under 35 U.S.C. 154(b) by 295 days.

(21) Appl. No.: 16/831,906

(22) Filed: Mar. 27, 2020

(65) Prior Publication Data
US 2020/0313136 A1    Oct. 1, 2020

(30) Foreign Application Priority Data
Mar. 29, 2019   (JP) .................................. 2019-068600

(51) Int. Cl.
| | | |
|---|---|---|
| *H01M 50/417* | (2021.01) | |
| *H01G 11/52* | (2013.01) | |
| *H01M 10/0525* | (2010.01) | |
| *H01M 50/449* | (2021.01) | |
| *H01M 50/489* | (2021.01) | |
| *H01M 50/411* | (2021.01) | |

(52) U.S. Cl.
CPC ........ *H01G 11/52* (2013.01); *H01M 10/0525* (2013.01); *H01M 50/411* (2021.01); *H01M 50/417* (2021.01); *H01M 50/449* (2021.01); *H01M 50/489* (2021.01)

(58) Field of Classification Search
CPC ............ H01M 50/411; H01M 50/417; H01M 50/449; H01M 10/052; H01M 10/0525
See application file for complete search history.

(56) References Cited

U.S. PATENT DOCUMENTS

| | | | | |
|---|---|---|---|---|
| 5,051,183 A | * | 9/1991 | Takita .................. | C08J 5/18 210/500.36 |
| 5,641,565 A | * | 6/1997 | Sogo ..................... | C08J 9/26 429/129 |
| 5,691,047 A | * | 11/1997 | Kurauchi ............ | H01M 50/449 428/315.7 |
| 2005/0277702 A1 | * | 12/2005 | Lee ..................... | H01M 50/406 521/142 |
| 2006/0141351 A1 | * | 6/2006 | Suh ..................... | H01M 50/403 264/235.8 |
| 2010/0068612 A1 | * | 3/2010 | Nishikawa ........... | H01M 50/457 429/129 |
| 2013/0183568 A1 | * | 7/2013 | Babinec .............. | H01M 50/446 429/142 |
| 2015/0017511 A1 | * | 1/2015 | Schmitz ................ | B29C 55/14 264/129 |
| 2017/0263906 A1 | * | 9/2017 | Sugata ................ | H01M 50/411 |
| 2018/0065105 A1 | * | 3/2018 | Song ................... | B01D 69/02 |
| 2018/0233730 A1 | * | 8/2018 | Ohya ................... | H01G 11/84 |
| 2018/0294455 A1 | * | 10/2018 | Saki .................... | H01G 11/52 |
| 2018/0294459 A1 | * | 10/2018 | Yamada .............. | B32B 27/18 |
| 2019/0036153 A1 | * | 1/2019 | Arise .................. | H01M 4/485 |
| 2019/0198836 A1 | * | 6/2019 | Ishihara ............ | H01M 10/0525 |
| 2019/0386278 A1 | * | 12/2019 | Ogata ................ | H01M 50/431 |
| 2020/0070470 A1 | * | 3/2020 | Yoshimaru .......... | H01M 50/489 |

FOREIGN PATENT DOCUMENTS

| | | | | |
|---|---|---|---|---|
| JP | 05-234578 A | | 9/1993 | |
| JP | 10-330520 A | | 12/1998 | |
| WO | WO 2017/010480 | * | 1/2017 | ............ B23B 5/22 |
| WO | WO-2017026482 A1 | * | 2/2017 | ............ B32B 5/18 |

\* cited by examiner

*Primary Examiner* — Jeremiah R Smith
(74) *Attorney, Agent, or Firm* — Oblon, McClelland, Maier & Neustadt, L.L.P.

(57) ABSTRACT

A polyolefin porous film is provided, the film comprising a polyethylene-based resin, wherein a weight average molecular weight of the polyethylene-based resin is 450,000 or less, and a content of a high molecular weight component having a molecular weight of 1,000,000 or more in the polyethylene-based resin is 2 to 11% by mass.

7 Claims, No Drawings

POLYOLEFIN POROUS FILM, SEPARATOR FOR ENERGY STORAGE DEVICE, AND ENERGY STORAGE DEVICE

TECHNICAL FIELD

The present invention relates to a polyolefin porous film which is excellent in tear resistance and gas permeability, a separator for energy storage devices having this polyolefin porous film, and an energy storage device.

BACKGROUND ART

Energy storage devices such as lithium secondary batteries have spread widely as power supply used in small electronic equipment such as mobile phones and notebook computers; electric cars; and the like. Such lithium secondary batteries comprise cathodes, anodes, separators for preventing short circuits wherein the separators are between the cathodes and the anodes, and a nonaqueous electrolytic solution. As the separators, polyolefin porous films obtained, for example, by using a polyolefin as a raw material, forming this into films and porosifying the films have been used.

Wet methods and dry methods are known as such a method for manufacturing a separator comprising a polyolefin porous film manufactured from a polyolefin as a raw material. In wet methods, a resin composition obtained by mixing additives such as a solvent into a polyolefin resin such as polyethylene (PE) or polypropylene (PP) is formed into a film, the additives are then extracted from the formed film, and the film after the additives are extracted is next drawn to manufacture a polyolefin porous film.

Meanwhile, dry methods are methods for forming voids using cleavage at the time of drawing to obtain a polyolefin porous film. When a dry method is adopted as a method for manufacturing a polyolefin porous film, a step of extracting additives such as a solvent, wherein the step is essential in a wet method, is unnecessary, and a dry method is therefore generally excellent in productivity as compared with a wet method.

For example, Patent Document 1 discloses a technique for laminating a film obtained by blown film extrusion, a spirally slit film and a film obtained by extrusion from a T-die, and then porosifying this by uniaxial drawing to obtain a polyolefin porous film as a technique for obtaining a polyolefin porous film by a dry method.

RELATED ART

Patent Documents

Patent Document 1: Japanese Patent Laid-Open No. 10-330520

SUMMARY OF THE INVENTION

Problem to be Solved by the Invention

In the technique of Patent Document 1, crossing layers in which the orientation direction is at a predetermined angle to the drawing direction are introduced by using the spirally slit film, and the polyolefin porous film excellent in tear resistance is thereby obtained. There was, however, a problem that such crossing layers did not have a good opening formed by drawing, and thus the obtained polyolefin porous film did not have enough gas permeability.

The present invention has been completed in view of such a situation, and an object of the present invention is to provide a polyolefin porous film which is excellent in tear resistance and gas permeability, a separator for energy storage devices wherein the separator has such a polyolefin porous film, and an energy storage device.

Means for Solving the Problem

When the present inventors have examined earnestly to achieve the above-mentioned object, the present inventors have found that using a polyethylene-based resin for forming a polyolefin porous film, comprising the polyethylene-based resin, wherein the weight average molecular weight is 450,000 or less, and the content of a high molecular weight component having a molecular weight of 1,000,000 or more is in a range of 2 to 11% by mass enables to achieve the above-mentioned object, and completed the present invention.

Specifically, the present invention provides the following [1] to [7].

[1] A polyolefin porous film, comprising a polyethylene-based resin,
wherein a weight average molecular weight of the polyethylene-based resin is 450,000 or less, and a content of a high molecular weight component having a molecular weight of 1,000,000 or more in the polyethylene-based resin is in the range of 2 to 11% by mass.

[2] The polyolefin porous film according to [1], wherein a molecular weight distribution of the polyethylene-based resin is in a range of 2 to 20.

[3] The polyolefin porous film according to [1] or [2], wherein a melt flow rate of the polyethylene-based resin is in a range of 0.1 to 10 g/10 minutes.

[4] The polyolefin porous film according to any one of [1] to [3], further comprising a polypropylene-based resin.

[5] The polyolefin porous film according to [4], wherein the polyolefin porous film has a polyethylene-based resin layer comprising the polyethylene-based resin and a polypropylene-based resin layer comprising the polypropylene-based resin.

[6] A separator for energy storage device, wherein the separator has the polyolefin porous film according to any one of [1] to [5].

[7] An energy storage device, comprising the separator for energy storage devices according to [6], a cathode and an anode.

Effects of Invention

According to the present invention, a polyolefin porous film which is excellent in tear resistance and gas permeability, a separator for energy storage devices wherein the separator has such a polyolefin porous film, and an energy storage device can be provided.

DESCRIPTION OF EMBODIMENTS

A polyolefin porous film of the present invention is a polyolefin porous film, comprising a polyethylene-based resin,
wherein the weight average molecular weight of the polyethylene-based resin is 450,000 or less, and the content of a high molecular weight component having a molecular weight of 1,000,000 or more in the polyethylene-based resin is in the range of 2 to 11% by mass.

When the present inventors have noticed a polyethylene-based resin and examined to improve the tear resistance and the gas permeability of a polyolefin porous film containing a polyethylene-based resin, the present inventors have found that using a polyethylene-based resin wherein the weight average molecular weight is 450,000 or less, and the content of a high molecular weight component having a molecular weight of 1,000,000 or more is in the range of 2 to 11% by mass enables the polyolefin porous film to be excellent in tear resistance and gas permeability.

[Polyolefin Porous Film]

A polyolefin porous film of the present invention contains a polyethylene-based resin.

In the present invention, the polyethylene-based resin wherein the polyethylene-based resin constitutes the polyolefin porous film, the weight average molecular weight is 450,000 or less, and the content of a high molecular weight component having a molecular weight of 1,000,000 or more is in the range of 2 to 11% by mass is used.

The weight average molecular weight (Mw) of the polyethylene-based resin is 450,000 or less, preferably in a range of 260,000 to 430,000, more preferably in the range of 270,000 to 400,000, and still more preferably in the range of 280,000 to 380,000. The content of a high molecular weight component having a molecular weight of 1,000,000 or more in the polyethylene-based resin is in the range of 2 to 11% by mass, preferably in the range of 5 to 10% by mass, and more preferably in the range of 6 to 9% by mass. The Gurley value can be reduced by adjusting the weight average molecular weight to 450,000 or less. Although a detailed cause for this has not become clear, it is considered that a decrease in the number of tie molecules and an increase in the size of pores are a main cause. When the content of the high molecular weight component having a molecular weight of 1,000,000 or more is more than 11% by mass, the polyolefin porous film is inferior in tear resistance. Although the detailed mechanism of this has not become clear, it is considered that since orientation relaxation after film formation is suppressed, molecule chains are probably highly oriented in the MD. When the content of the high molecular weight component having a molecular weight of 1,000,000 or more is less than 2% by mass, the polyolefin porous film is inferior in the pore opening property, the Gurley value (air permeability) increases greatly. The weight average molecular weight (Mw) and the content of the high molecular weight component having a molecular weight of 1,000,000 or more of the polyethylene-based resin can be determined, for example, by gel permeation chromatography (GPC) measurement as values in terms of polystyrene.

Although the molecular weight distribution (weight average molecular weight Mw/number average molecular weight Mn) of the polyethylene-based resin is not particularly limited, the molecular weight distribution is preferably in the range of 2 to 20, more preferably in the range of 4 to 17, and still more preferably in the range of 6 to 13. When the molecular weight distribution is in the above-mentioned range, the pore opening property can be good. The weight average molecular weight (Mw) and the number average molecular weight (Mn) of the polyethylene-based resin can be determined, for example, by gel permeation chromatography (GPC) measurement as values in terms of polystyrene.

The polyethylene-based resin has a melt flow rate (MFR) of preferably in the range of 0.1 to 10 g/10 minutes, more preferably in the range of 0.3 to 5 g/10 minutes, and still more preferably in the range of 0.6 to 3 g/10 minutes. If the melt flow rate is in the above-mentioned range, the melting of the polyethylene-based resin can be advanced appropriately when the energy storage device generates heat abnormally at the time of incorporating the polyolefin porous film into an energy storage device as a separator. Battery function can be stopped (shut down) appropriately thereby. The melt flow rate can be measured in accordance with JIS K6758 at 190° C. under a load of 2.16 kg.

In the present invention, the polyethylene-based resin may be a resin containing ethylene units at 80% by mass or more, preferably 90% by mass or more. Examples of the polyethylene-based resin include an ethylene homopolymer, a copolymer of ethylene and another olefin, and the like. The polyethylene-based resin may be used alone or in combination of two or more. The polyethylene-based resin may commonly contain additive agents such as a surfactant, an antioxidant agent, a plasticizer, a fire retardant and a coloring agent depending on the object.

Although the density of the polyethylene-based resin is not particularly limited, the density is preferably in a range of 0.950 to 0.970 g/cm$^3$. Although high-density polyethylene having a density of 0.960 g/cm$^3$ or more is more preferable as the polyethylene-based resin, the polyethylene-based resin may be medium-density polyethylene.

Although the melting point of the polyethylene-based resin is not particularly limited, the melting point is preferably in a range of 125 to 140° C., and is more preferably in the range of 130 to 136° C.

As a method for manufacturing a polyethylene-based resin, a conventionally well-known method can be used, and the method is not particularly limited. For example, the polyethylene-based resin can be manufactured using a catalyst such as a Ziegler-Natta catalyst and a metallocene catalyst, and especially the method using a Ziegler-Natta catalyst is preferable. Although the polymerization method may be either of a single stage method and a multistage method, the multistage method is more preferable. The weight average molecular weight and the content of the high molecular weight component having a molecular weight of 1,000,000 or more of the polyethylene-based resin can be controlled by adjusting various manufacturing conditions such as polymerization temperature and the amount of the catalyst.

In multistage polymerization, it is preferable to perform polymerization sequentially and continuously in a plurality of polymerization reactors connected in series or in parallel. Polymerization can be performed in an organic solvent, a liquid monomer or a gaseous phase. In the multistage polymerization, for example, ethylene is first polymerized, or ethylene and an α olefin is copolymerized in the first step to manufacture polyethylene to be the high molecular weight component. Ethylene and hydrogen are subsequently introduced into the polymerization system in the second step to manufacture polyethylene to be a low molecular weight component. To be brief, in the multistage polymerization, the polyethylene-based resin containing the high molecular weight component and the low molecular weight component can be manufactured, and such an aspect is preferably adopted. According to such a method, the polyethylene-based resin having a weight average molecular weight and the content of the high molecular weight component having a molecular weight of 1,000,000 or more in desired ranges can be obtained. Alternatively, a method for manufacturing polyethylene which is the low molecular weight component in the first step and manufacturing polyethylene which is the high molecular weight component in the second step sequentially may be adopted. Examples of the α-olefin copolymerized with ethylene include propylene, 1-butene, 1-pentene, 4-methyl-1-pentene, 1-hexene, 1-heptene, 1-octene, 1-nonene, 1-decene and the like.

The polyolefin porous film of the present invention may contain a polypropylene-based resin in addition to the above-mentioned polyethylene-based resin.

The polypropylene-based resin may be a resin containing propylene units at 80% by mass or more, preferably 95% by mass or more, and examples of the polypropylene-based resin include a propylene homopolymer, a copolymer of propylene and another olefin, and the like. The polypropylene-based resin may be used alone or in combination of two or more. The copolymer of propylene and the other olefin may be either of a block copolymer and a random copolymer. Examples of the olefin copolymerized with propylene include α-olefins such as ethylene, 1-butene, 1-pentene, 4-methyl 1-pentene, 1-hexene, 1-heptene, 1-octene, 1-nonene, 1-decene and the like. The polypropylene-based resin may commonly contain additive agents such as a surfactant, an antioxidant agent, a plasticizer, a fire retardant and a coloring agent depending on the object.

Although the weight average molecular weight (Mw) of the polypropylene-based resin is not particularly limited, the weight average molecular weight is preferably in a range of 250,000 to 1,200,000, more preferably in the range of 500,000 to 1,000,000, still more preferably in the range of 500,000 to 900,000, and particularly preferably in the range of 550,000 to 850,000. According to the polypropylene-based resin having a weight average molecular weight in the above-mentioned range, even when a precursor film (film to be formed into a polyolefin porous film by drawing and porosification) is manufactured by coextrusion, the polyolefin porous film having good open pores can be provided. Especially when a polypropylene resin having a weight average molecular weight in the range of 600,000 to 850,000 is used, the polyolefin porous film which is excellent in the pore opening property and strength can be manufactured.

Although the molecular weight distribution (weight average molecular weight Mw/number average molecular weight Mn) of the polypropylene-based resin is not particularly limited, the molecular weight distribution is preferably in a range of 7.5 to 15.0, more preferably in the range of 8.0 to 14.5, and still more preferably in the range of 8.5 to 14.0. The aperture ratio of the polyolefin porous film can be further increased by adjusting the molecular weight distribution to the above-mentioned range, and the Gurley value of the polyolefin porous film can be further increased thereby. The weight average molecular weight (Mw) and the number average molecular weight (Mn) of the polypropylene-based resin can be determined, for example, by gel permeation chromatography (GPC) measurement as values in terms of polystyrene.

Although the mesopentad fraction of the polypropylene-based resin is not particularly limited, the mesopentad fraction is preferably 90% or more, more preferably 96% or more, still more preferably 96.1% or more, and particularly preferably 96.2% or more. According to the polypropylene-based resin having a pentad fraction of 90% or more, when the precursor film (film to be formed into a polyolefin porous film by drawing and porosification) is manufactured by coextrusion, lamellar crystals can be grown more appropriately. When the precursor film is formed into a porous film by drawing and porosification, the obtained polyolefin porous film having a good porosity can be formed thereby. Although the upper limit of the mesopentad fraction is not particularly limited, the upper limit is preferably 98% or less, and more preferably 97.8% or less. The mesopentad fraction means, for example, a rate at which 5 sequential propylene monomer units in the polypropylene-based resin quantified based on peak attribution in a $^{13}C$-nuclear magnetic resonance spectrum have an equal stereostructure, and is commonly used as an index of tacticity.

As a method for manufacturing a polypropylene-based resin, a conventionally well-known method can be used, and the method is not particularly limited. For example, the polypropylene-based resin can be manufactured using a catalyst such as a Ziegler-Natta catalyst and a metallocene catalyst, and especially a method using a Ziegler-Natta catalyst is preferable. The polymerization method may be either of a single stage method and a multistage method. The weight average molecular weight, the molecular weight distribution, the mesopentad fraction and the like can be controlled by adjusting various manufacturing conditions such as polymerization temperature and the amount of the catalyst.

The polyolefin porous film of the present invention may contain the polyethylene-based resin, and may be constituted by only the polyethylene-based resin, or may contain the polyethylene-based resin and the polypropylene-based resin.

When the polyolefin porous film of the present invention contains the polyethylene-based resin and the polypropylene-based resin, the polyethylene-based resin and the polypropylene-based resin may be blended by kneading or the like to form a monolayer film, or the polyethylene-based resin and the polypropylene-based resin may be laminated. When the polyethylene-based resin and the polypropylene-based resin are laminated, its structure is not particularly limited, and the structure may be a structure having a polypropylene-based resin layer containing the above mentioned polypropylene-based resin (hereinafter called PP layer) on a polyethylene-based resin layer containing the above-mentioned polyethylene-based resin (hereinafter called PE layer). Examples of the structure include trilayer structures such as PE layer/PP layer/PE layer, and PP layer/PE layer/PP layer; and pentalayer structures such as PP layer/PE layer/PP layer/PE layer/PP layer, and PE layer/PP layer/PE layer/PP layer/PE layer; and the like. Among these, the structure formed by disposing a pair of PP layers containing the polypropylene-based resin on both surfaces of a PE layer containing the polyethylene-based resin, namely the trilayer structure of PP layer/PE layer/PP layer, is preferable.

The polyolefin porous film of the present invention has a film thickness of preferably 40 μm or less, more preferably 35 μm or less, and still more preferably 30 μm or less. When the film thickness is 40 μm or less, the ion conductivity can be enough in the case where the polyolefin porous film is used as a separator for an energy storage device, the rate characteristic of the energy storage device can be good thereby. The lower limit of the film thickness of the polyolefin porous film of the present invention is preferably 7 μm or more, more preferably 8 μm or more, still more preferably 10 μm or more. When the film thickness is 7 μm or more, the occurrence of film breakage is can be suppressed appropriately in the case where the polyolefin porous film is used as a separator for an energy storage device, the occurrence of the short circuit of the energy storage device can be suppressed effectively.

The film thickness of the polyolefin porous film can be measured, for example, by a method for performing the image analysis of an image in which the section of the polyolefin porous film is photographed by a scanning electron microscope (SEM) or a method for using a multipoint thickness meter.

Although the porosity of the polyolefin porous film of the present invention is not particularly limited, the porosity is preferably in a range of 45 to 70%, and more preferably in the range of 45 to 55%.

When the polyolefin porous film of the present invention is used as a separator for energy storage devices, the Gurley value (air permeability) is preferably 230 seconds/100 cc or less, and more preferably 200 seconds/100 cc or less. When the Gurley value of the polyolefin porous film is 230 seconds/100 cc or less, an increase in impedance at the time of storage at high temperature can be suppressed effectively in an energy storage device using the polyolefin porous film as a separator. When the Gurley value of the polyolefin porous film is too low, a short circuit easily occurs in the energy storage device using the polyolefin porous film as a separator at the time of operating an energy storage device. For this reason, the Gurley value of the polyolefin porous film is preferably 50 seconds/100 cc or more, more preferably 65 seconds/100 cc or more, and still more preferably 75 seconds/100 cc or more.

The ratio of the Gurley value of the PE layer to the Gurley value of the polyolefin porous film (the Gurley value for all the layers or the total Gurley value) (Ratio of the Gurley value of the PE layer (%)=(Gurley value of PE layer/total Gurley value)×100) is preferably 20% or less, more preferably 17% or less, and still more preferably 14% or less. When the polyolefin porous film is used as a separator for an energy storage device, the safety can be enough while the ion mobility can be good by the low ratio of the Gurley value of the PE layer as mentioned above.

The content of the polyethylene-based resin in the polyolefin porous film is preferably in a range of 20 to 70% by mass, more preferably in the range of 30 to 60% by mass, and still more preferably in the range of 35 to 55% by mass based on the total weight of the polyolefin porous film at 100% by mass. In an energy storage device where the polyolefin porous film formed by laminating the polyethylene-based resin and the polypropylene-based resin is incorporated as a separator, setting of the content of the polyethylene-based resin in the above-mentioned range can provide melting of a sufficient amount of the polyethylene-based resin in the event of abnormal heat generation of the energy storage device, thereby closing open pores formed in the PP layer appropriately and stopping (shutting down) the battery function appropriately.

[Method for Manufacturing Polyolefin Porous Film]

Although a method for manufacturing a polyolefin porous film of the present invention is not particularly limited, the dry process using no solvent at the time of manufacturing is preferable. A polyolefin porous film manufactured by a wet process using a solvent is inferior in productivity as compared with a dry method since the solvent is used, an irremovable solvent component moreover remains in the obtained polyolefin porous film, the meltdown temperature does not improve due to that the irremovable solvent component acts as a plasticizer, and the wet process is therefore unpreferable.

The steps of manufacturing a polyolefin porous film of the present invention will be described hereinafter.

The polyolefin porous film of the present invention can be manufactured, for example, through three steps which are a step of manufacturing a precursor film, a step of heating the precursor film, and a step of drawing the precursor film. Although a case where a precursor film having a PE layer as an intermediate layer with PP layers disposed on both surfaces thereof is manufactured will be illustrated and described hereinafter, the precursor film is not particularly limited to such an aspect.

[Step of Manufacturing Precursor Film]

The step of manufacturing a precursor film is a step of manufacturing a precursor film by a method for forming a film by extruding the above-mentioned polyethylene-based resin and the above-mentioned polypropylene-based resin into a film, namely a method for forming a film by coextrusion.

Although a device to be used for coextrusion when the polyethylene-based resin and the polypropylene-based resin are coextruded is not particularly limited, a conventionally well-known device can be used. Examples of such a device for coextrusion include a coextruder comprising a circular die, a coextruder comprising a feed block or a multimanifold T-die, and the like.

The die temperature at the time of performing coextrusion using a coextruder (namely, film-forming temperature) is preferably in a range of 185 to 240° C., more preferably in the range of 190 to 235° C., and still more preferably in the range of 195 to 230° C. The precursor film can be formed without rupture at the time of film formation by adjusting the die temperature to 185° C. or more. The deterioration of the polypropylene-based resin by heat can be reduced by adjusting the die temperature to 240° C. or less, and a decrease in the characteristics of the finally obtained polyolefin porous film can be suppressed.

[Step of Heating Precursor Film]

The step of heating a precursor film is a step of heat-treating the precursor film obtained in the above-mentioned step of manufacturing a precursor film. The polyethylene-based resin and the polypropylene-based resin constituting the precursor film can be crystallized by heat-treating the precursor film, the precursor film can be made suitable for porosification by drawing thereby, and porosification by drawing can be more preferably performed. The degree of crystallinity of the precursor film can be controlled by heat treatment conditions. The open pore characteristic of the polyolefin porous film obtained by drawing and porosification can be adjusted by controlling the degree of crystallinity by heat treating conditions (namely, the open pore characteristic can be indirectly controlled).

Examples of the heat treatment method include a method for contacting the precursor film with rolls heated beforehand, a method for passing the precursor film through an environment warmed at a predetermined temperature, and the like, and a suitable method may be used.

The heat treatment temperature is preferably 110° C. or more and 145° C. or less, more preferably more than 128° C. and 140° C. or less, and still more preferably 130° C. or more and 136° C. or less. The degree of crystallinity of the precursor film can be increased more appropriately by adjusting the heat treatment temperature to the above-mentioned range, and the Gurley value (air permeability) of the obtained polyolefin porous film can be fully reduced. The heat treatment time is preferably in a range of 20 seconds to 60 minutes, more preferably in the range of 40 seconds to 40 minutes, and still more preferably in the range of 70 seconds to 20 minutes. The heat treatment time may be suitably determined according to the above-mentioned temperature of heat treatment.

The layer thickness ratio of the PE layer to the PP layer may be changed suitably depending the object. For example, in the case of a trilayer structure of PP layer/PE layer/PP layer, the thickness of a PP layer of each surface layer may be at least the same thickness as the thickness of the PE layer or thinner than the thickness of the PE layer from the viewpoint that the PE layer is heat-treated surely, and good open pores are formed in the PP layers. The PE layer can be heat-treated surely by forming such a layer structure, and good open pores can be formed in the PE layer at the time of drawing. If the polyolefin porous film obtained by such a structure is incorporated into an energy storage device as a separator, an enough amount of the polyethylene-based resin can be molten when the energy storage device generates heat abnormally, open pores formed in the PP layer can be closed appropriately thereby. Battery function can be stopped (shut down) appropriately thereby.

The lamella thickness in the PP layer of the heat-treated precursor film is a value measured by an X-ray small angle scattering method, and the lamella thickness is preferably in a range of 90 to 150 Å, more preferably in the range of 95 to 140 Å, still more preferably in the range of 100 to 130 Å, and particularly preferably in the range of 100 to 120 Å. The PP layer can have fine open pores as compared with the PE layer and have a high Gurley value as compared with the Gurley value of the PE layer by adjusting the lamella thickness to the above-mentioned range. The effect of increasing the liquid retainability is expected by forming such a layer structure. When the polyolefin porous film of the present invention is used as a separator for an energy storage device, the occurrence of liquid shortage or the like can be reduced effectively, and the withstand voltage characteristics of the energy storage device can also be expected to improve.

The lamella thickness of the PE layer in the heat-treated precursor film is a value measured by an X-ray small angle scattering method, the lamella thickness is preferably in a range of 130 to 300 Å, and its lower limit is more preferably 140 Å or more, and still more preferably 150 Å or more. When the lamella thickness is 130 Å or more, pores having comparatively large pore sizes can be formed in the PE layer through drawing and porosification treatment, and the Gurley value (air permeability) of the obtained polyolefin porous film can be fully reduced. Meanwhile, if the lamella thickness of PE layer is less than 130 Å, the obtained polyolefin porous film has good withstand voltage characteristics, but too high a Gurley value. If such a polyolefin porous film is used as a separator for energy storage devices, the polyolefin porous film may not be suitable as a separator for energy storage devices. Less than 130 Å of the lamella thickness is not preferable from the viewpoint of the withstand voltage characteristics.

The Gurley value between the PE layer and the PP layer of the film obtained by drawing and porosifying the precursor film can be controlled to a comparative low value by adjusting the lamella thicknesses of the PE layer and the PP layer in the heat-treated precursor film to the values as mentioned above.

[Step of Drawing Precursor Film]

The step of drawing the precursor film is a step of porosifying by drawing (drawing and porosifying) the precursor film heated in the above-mentioned step of heating the precursor film to obtain a polyolefin porous film thereby.

Although the drawing process in the drawing step is not particularly limited, examples of the drawing process include an uniaxial drawing process in the machine direction (MD), an uniaxial drawing process in the width direction almost perpendicular to the machine direction (TD), a successive biaxial drawing process for drawing in the machine direction (MD) and subsequently the width direction (TD), a simultaneous biaxial drawing process for drawing in the machine direction (MD) and the width direction (TD) almost simultaneously, a tubular biaxial drawing process, and the like. A drawing process suitable depending the object may be adopted among these.

Examples of a specific drawing and porosification method include a method for subjecting the heat-treated precursor film to low temperature drawing in a low temperature drawing zone, subsequently drawing the precursor film in a higher temperature drawing zone at a higher temperature than the temperature of the low temperature drawing, and porosifying the precursor film to obtain a polyolefin porous film. Both the polypropylene-based resin and the polyethylene-based resin cannot be fully porosified by only either of the low temperature drawing and the high temperature drawing, and the polyolefin porous film may not be able to be formed.

Although the temperature of the low temperature drawing is not particularly limited, the temperature is preferably −20° C. or more and +50° C. or less, and more preferably +20° C. or more and +40° C. or less. When the temperature of the low temperature drawing is too low, the precursor film unpreferably ruptures easily during drawing. Meanwhile, when the temperature of the low temperature drawing is too high, open pores are hardly formed in the polyethylene-based resin in the precursor film, and such a temperature is therefore unpreferable.

Although the draw ratio of the low temperature drawing is not particularly limited, the draw ratio is preferably in the range of 3% or more and 200% or less, and more preferably in the range of 5% or more and 100% or less. When the draw ratio of the low temperature drawing is 3% or more, the polyolefin porous film having an enough low Gurley value is easily obtained. Meanwhile, if the draw ratio of the low temperature drawing is more than 200%, crazes occur and then change into cracks, causing film rupture. For this reason, the draw ratio of the low temperature drawing is preferably 200% or less.

The temperature of the high temperature drawing is preferably 70° C. or more and 150° C. or less, and more preferably 80° C. or more and 145° C. or less. Porosification in the high temperature drawing can be enough by adjusting the temperature of the high temperature drawing to this range, and the polyolefin porous film having an enough low Gurley value is easily obtained.

Although the draw ratio of the high temperature drawing is not particularly limited, the draw ratio is preferably in the range of 100% or more and 400% or less. When the draw ratio of the high temperature drawing is too low, the Gurley value of the polyolefin porous film may not be enough low. If the draw ratio of the high temperature drawing is too high, the Gurley value of the polyolefin porous film may too low.

The polyolefin porous film of the present invention can be manufactured as mentioned above.

Although a method for manufacturing a precursor film by coextrusion, namely a coextruding method, was illustrated above, the polyolefin porous film may be manufactured instead of a coextruding method by a laminating method in which the polyethylene-based resin film and the polypropylene-based resin film are separately provided, these are heat-treated separately and then laminated, and the laminated film is drawn and porosified to manufacture a polyolefin porous film.

In the laminating method, the polyethylene-based resin film and the polypropylene-based resin film are separately manufactured by melt molding or the like with a T-die. In the melt molding, each of the polyethylene-based resin and the polypropylene-based resin is subjected to the melt molding with the T-die under conditions of temperature of 20° C. or more and 60° C. or less with respect to a melting temperature thereof and a draft ratio of 10 or more and 1,000 or less, preferably 50 or more and 500 or less, and the polyethylene-based resin film and the polypropylene-based resin film can be manufactured. Although the take-off speed at this time is not particularly limited, the polyethylene-based resin film and the polypropylene-based resin film are formed preferably at in a range of 10 to 200 m/minute.

Subsequently, the polyethylene-based resin film and the polypropylene-based resin film obtained by melt molding through a T die or the like are laminated by thermocompression bonding to obtain a precursor film. The polyethylene-based resin film and the polypropylene-based resin film are subjected to thermocompression bonding by passing these between heated rolls. The polyethylene-based resin film and the polypropylene-based resin film are specifically wound from a plurality of raw material roll stands, nipped, crimped and laminated between the heated rolls. For example, in the case of a trilayer structure of PP layer/PE layer/PP layer, a polyethylene-based resin film and polypropylene-based resin films may be fed between the heated rolls so that laminating by thermocompression bonding may be performed in this order.

The temperature of the rolls when the films are subjected to thermocompression bonding (thermocompression bonding temperature) is preferably 120° C. or more and 160° C. or less, and still more preferably 125° C. or more and 150° C. or less. When the thermocompression bonding temperature is too low, the peeling strength between the films is weak, and exfoliation occurs in a subsequent drawing step. On the contrary, when the thermocompression bonding temperature is too high, the polyethylene-based resin film melts.

The precursor film obtained by such a laminating method is porosified by drawing in the same way as the precursor film obtained by the above-mentioned coextrusion to obtain a polyolefin porous film of the present invention.

As mentioned above, although the polyolefin porous film of the present invention can be manufactured by obtaining the precursor film by a method by coextrusion or a laminating method and porosifying by drawing this, the method by coextrusion is preferable in the present invention from the viewpoint that the polyolefin porous film can be manufactured at high manufacturing efficiency as compared with the laminating method. In more detail, while the polyethylene-based resin film and the polypropylene-based resin film needs to be first formed individually and subsequently heat-treated, and these then needs to be laminated and fused to obtain the precursor film in the laminating method, the polyethylene-based resin and the polypropylene-based resin are extruded together, and the precursor film having the polyethylene-based resin layer and the polypropylene-based resin layer can be formed together according to the coextruding method. The precursor film and the polyolefin porous film can be therefore manufactured at high efficiency as compared with the laminating method, and the coextruding method is therefore preferable.

Especially the polyolefin porous film of the present invention contains a polyethylene-based resin wherein the weight average molecular weight is 450,000 or less, and the content of the high molecular weight component having a molecular weight of 1,000,000 or more is in the range of 2 to 11% by mass. Even when the manufacturing is performed in combination of the polypropylene-based resin by the coextruding method, excellent tear resistance and gas permeability can therefore be achieved.

[Energy Storage Device]

An energy storage device of the present invention comprises a separator for energy storage devices including the above-mentioned polyolefin porous film of the present invention, a cathode, and an anode.

(Nonaqueous Electrolytic Solution)

The energy storage device of the present invention usually comprises a nonaqueous electrolytic solution besides the separator for energy storage devices including the above-mentioned polyolefin porous film of the present invention, a cathode and an anode. Preferable examples of the nonaqueous solvent used for the nonaqueous electrolytic solution include cyclic carbonates and chain esters. Since the electrochemical characteristics in a wide temperature range, especially at high temperature, improve synergistically, a chain ester is preferably contained, a chain carbonate is more preferably contained, both a cyclic carbonate and a chain carbonate are most preferably contained. The term "chain ester" is used as a concept including a chain carbonate and a chain carboxylate ester.

Examples of the cyclic carbonate include one or more selected from ethylene carbonate (EC), propylene carbonate (PC) and vinylene carbonate (VC), and the combination of EC and VC and the combination of PC and VC are particularly preferable.

It is preferable that the nonaqueous solvent contains ethylene carbonate and/or propylene carbonate, since the stability of a coating formed on an electrode increases, and high temperature and high voltage cycle characteristics are improved. The content of ethylene carbonate and/or propylene carbonate is preferably 3% by volume or more, more preferably 5% by volume or more, and still more preferably 7% by volume or more based on the total volume of the nonaqueous solvent. Its upper limit is preferably 45% by volume or less, more preferably 35% by volume or less, and still more preferably 25% by volume or less.

Preferable examples of the chain ester include methyl ethyl carbonate (MEC) as an asymmetrical chain carbonate, dimethyl carbonate (DMC) and diethyl carbonate (DEC) as symmetrical chain carbonates, and ethyl acetate (hereinafter called EA) as a chain carboxylate ester. Among the chain esters, chain esters such as MEC and EA which is asymmetrical and containing an ethoxy group can be combined.

Although the content of the chain ester is not particularly limited, the chain ester is preferably used in the range of 60 to 90% by volume based on the total volume of the nonaqueous solvent. When the content of the chain ester is 60% by volume or more, the viscosity of the nonaqueous electrolytic solution is not too high. When the content is 90% by volume or less, the nonaqueous electrolytic solution may hardly decrease in electrical conductivity, and thus in electrochemical characteristics in a wide temperature range, especially at high temperature, and the content is therefore preferably in the above-mentioned range.

The volume ratio of EA among chain esters is preferably 1% by volume or more, and more preferably 2% by volume or more in the nonaqueous solvent. Its upper limit is more preferably 10% by volume or less, and still more preferably 7% by volume or less. The asymmetrical chain carbonate more preferably has an ethyl group, and methyl ethyl carbonate is particularly preferable.

The ratio of the cyclic carbonate to the chain ester, which is the cyclic carbonate:the chain ester (volume ratio), is preferably in a range of 10:90 to 45:55, more preferably in the range of 15:85 to 40:60, and particularly preferably in the range of 20:80 to 35:65 from the viewpoint of improvement in the electrochemical characteristics in a wide temperature range, especially at high temperature.

Preferable examples of an electrolyte salt used for the nonaqueous electrolytic solution include lithium salts. As the lithium salts, one or more selected from the group consisting of $LiPF_6$, $LiBF_4$, $LiN(SO_2F)_2$ and $LiN(SO_2CF_3)_2$ are preferable, one or more selected from the group consisting of $LiPF_6$, $LiBF_4$, and $LiN(SO_2F)_2$ are more preferable, and $LiPF_6$ is still more preferably used.

The nonaqueous electrolytic solution can be obtained, for example, by a method in which the above-mentioned nonaqueous solvent is mixed and to this solvent are added a composition obtained by mixing the above-mentioned electrolyte salt, a solubilizing agent and the like at a specific mixing ratio. At this time, the nonaqueous solvent and a compound to be added to a nonaqueous electrolytic solution wherein the nonaqueous solvent and the compound are purified beforehand as long as the productivity is not reduced markedly, and impurities are as little as possible are preferably used.

The separator for energy storage devices including the polyolefin porous film of the present invention can be used, for example, for the following first and second energy storage devices. In these cases, not only a liquid matter but also a gelled matter can be used as the nonaqueous electrolyte. The separator is preferably used as a separator for a lithium ion battery (first energy storage device) and a lithium ion capacitor (second energy storage device) using a lithium salt as an electrolyte salt, more preferably used for a lithium ion battery, and still more preferably used for a lithium ion secondary battery.

(First Energy Storage Device)

A lithium ion secondary battery as a first energy storage device has a cathode, an anode and the above-mentioned nonaqueous electrolytic solution. Components such as a cathode and an anode can be used particularly without limitation.

For example, as a cathode active material for a lithium ion secondary battery, a complex metal oxide with lithium containing one or more selected from the group consisting of cobalt, manganese and nickel is used. These cathode active materials may be used alone or in combination of two or more.

Preferable examples of such a lithium complex metal oxide include one or more selected from $LiCoO_2$, $LiCo_{1-x}M_xO_2$ (wherein M is one or more elements selected from Sn, Mg, Fe, Ti, Al, Zr, Cr, V, Ga, Zn and Cu), $LiMn_2O_4$, $LiNiO_2$, $LiCo_{1-x}Ni_xO_2$, $LiCo_{1/3}Ni_{1/3}Mn_{1/3}O_2$, $LiNi_{0.5}Mn_{0.3}Co_{0.2}Mn_{0.3}O_2$, $LiNi_{0.8}Mn_{0.1}Co_{0.1}O_2$, $LiNi_{0.8}Co_{0.15}Al_{0.05}O_2$, a solid solution of $Li_2MnO_3$ and $LiMO_2$ (wherein M is a transition metal such as Co, Ni, Mn and Fe), and $LiNi_{1/2}Mn_{3/2}O_4$.

The cathode can be manufactured by mixing the above-mentioned cathode active material with a conductive agent such as acetylene black; and a binder such as polytetrafluoroethylene (PTFE), polyvinylidene fluoride (PVDF), a copolymer of styrene and butadiene (SBR), a copolymer of acrylonitrile and butadiene (NBR) or carboxymethyl cellulose (CMC), adding a solvent to this and kneading the mixture to prepare a cathode mixture, and then applying this cathode mixture to aluminum foil, a plate made of stainless steel, or the like, followed by drying, pressure molding, and subsequent heat treatment under predetermined conditions. The conductive agent is not particularly limited as long as the conductive agent is an electron conductive material which does not chemically change. Examples of the conductive agent include one or more types of carbon black or the like selected from graphite such as natural graphite (flake graphite or the like) and artificial graphite; acetylene black; and the like.

As an anode active material for a lithium ion secondary battery, a lithium metal and a lithium alloy; and carbon materials, tin (simple substance), tin compounds, silicon (simple substance), silicon compounds, lithium titanate compounds such as $Li_4Ti_5O_{12}$, or the like which can occlude and release lithium can be used alone or in combination of two or more.

Among these, highly crystalline carbon materials such as artificial graphite and natural graphite are more preferable from the viewpoint that the carbon materials are highly capable of occluding and releasing lithium ions.

Especially artificial graphite particles having a massive structure in which a plurality of flat graphite particulates gather or bind non-parallelly to each other, or particles obtained by applying mechanical actions such as compressive force, frictional force and shearing force repeatedly and subjecting natural flake graphite to spheroidizing treatment are preferably used.

The anode can be manufactured by kneading the same conductive agent, the same binder and the same high boiling point solvent as the manufacturing of the above-mentioned cathode, preparing an anode mixture, then applying this anode mixture to copper foil or the like which is a current collector, followed by drying, pressure molding, and subsequent heat treatment under predetermined conditions.

The structure of the lithium ion secondary battery as the first energy storage device is not particularly limited, and a coin battery, a cylindrical battery, a square battery, a laminated battery or the like can be applied.

A wound lithium ion secondary battery has, for example, a structure in which an electrode assembly is contained together with the nonaqueous electrolytic solution in a battery case. The electrode assembly is constituted by the cathode, the anode and the separator. At least a part of the nonaqueous electrolytic solution is impregnated into the electrode assembly.

The wound lithium ion secondary battery includes a long sheet-shaped cathode current collector and the cathode active material as the cathode and include a cathode mixture layer provided on the cathode current collector. The wound lithium ion secondary battery includes a long sheet-shaped anode current collector and the anode active material as the anode and include an anode mixture layer provided on the anode current collector. The separator is formed in the shape of a long sheet in the same way as the cathode and the anode. The cathode and the anode are wound cylindrically with the separator therebetween.

The battery case comprises a bottomed cylindrical case body and a lid which closes the opening of the case body. The lid and the case body are made of, for example, metal, and are insulated mutually. The lid is electrically connected to the cathode current collector, and the case body is electrically connected to the anode current collector. The lid may also serve as a cathode terminal and the case body may also serve as an anode terminal.

The lithium ion secondary battery can be charged and discharged at in a range of −40 to 100° C., preferably in the range of −10 to 80° C. As a measure against an internal pressure increase in the wound lithium ion secondary battery, a method of providing a safety valve on the lid of the battery or a method of making a cut in a member such as the case body or the gasket of the battery can also be adopted. A current breaking mechanism which detects the internal pressure of a battery and cuts current can also be provided in a lid as a safety measure for the prevention of overcharge.

As an example, a procedure for manufacturing a lithium ion secondary battery will be described hereinafter.

First, a cathode, an anode and a separator are produced separately. Next, an electrode assembly is assembled by laminating and winding them cylindrically. Subsequently, the electrode assembly is inserted into a case body, and a nonaqueous electrolytic solution is injected into the case body. The electrode assembly is impregnated with the nonaqueous electrolytic solution thereby. After the nonaqueous electrolytic solution is injected into the case body, the case body is covered with a lid, and the lid and the case body are sealed. The shape of the electrode assembly after winding is not limited to a cylindrical shape. For example, a cathode, a separator and an anode are wound, and may be then formed into a flat shape by applying pressure from aside.

The above-mentioned lithium ion secondary battery can be used as a secondary battery for various uses. For example, vehicles such as cars are equipped with the battery, which can be preferably used as power sources for driving sources such as motors which drives vehicles. Although the types of vehicles are not particularly limited, and examples of the vehicles include hybrid cars, plug-in hybrid cars, electric cars, fuel cell powered cars and the like. Such a lithium ion secondary battery may be used alone, or a plurality of batteries may be connected in series and/or in parallel and used.

Although the wound lithium ion secondary battery was illustrated above, the present invention is not limited to such an aspect, and may be applied to a laminated lithium ion secondary battery.

(Second Energy Storage Device)

Examples of a second energy storage device include a lithium ion capacitor. The lithium ion capacitor has a separator for energy storage devices having the above-mentioned polyolefin porous film of the present invention as a separator, a nonaqueous electrolytic solution, a cathode and an anode. The lithium ion capacitor can store energy through the intercalation of lithium ions into a carbon material such as graphite which is an anode. Examples of the cathode include a cathode using an electric double layer between an activated carbon electrode and an electrolytic solution and a cathode using the doping/dedoping reactions of a π-conjugated polymer electrode. At least a lithium salt such as $LiPF_6$ is contained in the electrolytic solution.

EXAMPLES

Next, although the present invention will be described more specifically by presenting Examples and Comparative Examples, the present invention is not limited to following Examples and includes various combinations which can be easily analogized from the gist of the invention.

Precursor films were formed by coextruding methods in methods shown below using polyethylene-based resins and polypropylene-based resins having characteristics shown in Table 1, and the polyolefin porous films of Examples 1 to 4 and Comparative Examples 1 to 3 were then formed by drawing and porosifying the precursor films. The precursor films and the polyolefin porous films of Examples 1 to 4 and Comparative Examples 1 to 3 had a trilayer structure having PP layer/PE layer/PP layer.

Characteristics were measured by methods shown below.

[Weight Average Molecular Weight (Mw), Molecular Weight Distribution (Mw/Mn) and Content of High Molecular Weight Component having a Molecular Weight of 1,000,000 or More of Polyethylene-Based Resin]

The weight average molecular weight (Mw), the molecular weight distribution (Mw/Mn) and the content of a high molecular weight component having a molecular weight of 1,000,000 or more of each polyethylene-based resin were determined using a gel permeation chromatograph by Agilent Technologies, Inc. in terms of standard polystyrene. Two Agilent PLgel Olexis columns were used, and measurement was performed in orthodichlorobenzene prepared at 0.05 wt/vol % at 145° C. A differential refractometer (RI) was used for a detector.

[Melt Flow Rate (MFR) of Polyethylene-Based Resin]

The melt flow rate of each polyethylene-based resin was measured in accordance with JIS K6758 at 190° C. under a load of 2.16 kg.

[Weight Average Molecular Weight (Mw) and Molecular Weight Distribution (Mw/Mn) of Polypropylene-Based Resin]

The weight average molecular weight (Mw) and the molecular weight distribution (Mw/Mn) of each polypropylene-based resin were determined using a gel permeation chromatograph by Agilent Technologies Japan, Ltd. in terms of standard polystyrene. Two Agilent PLgel Olexis columns were used, and measurement was performed in orthodichlorobenzene prepared at 0.05 wt/vol % at 145° C. The differential refractometer (RI) was used for a detector.

[Mesopentad Fraction of Polypropylene-Based Resin [mmmm] (NMR (Nuclear Magnetic Resonance) Measurement)]

The polypropylene-based resin is dissolved in an ODCB (1, 2-dichloroben.zene) /$C_6D_6$ (4/1) solvent at a concentration of 10 wt/vol %, $^{13}$C-NMR measurement was performed under conditions of a resolution of 100 MHz, a temperature of 130° C., and a cumulative number of 8000, and the mesopentad fraction was calculated from a peak height method.

[Film Thickness of Polyolefin Porous Film]

The film thickness of each polyolefin porous film was measured using a dial gauge (manufactured by OZAKI MFG. CO., LTD., trade name "PEACOCK No. 25").

[Gurley Value of Polyolefin Porous Film (Air Permeability)]

A specimen having a full width of 80 mm in MD was collected from each of the manufactured polyolefin porous films. The Gurley values of the polyolefin porous film was measured using a B type gurley densometer (manufactured by Toyo Seiki Seisaku-sho, Ltd.) in accordance with JIS P8117 as to three points which were the center and the right and left ends (50 mm inside from the end faces). The average value of three points was evaluated as the Gurley value of the polyolefin porous film.

[Gurley Value of Polyethylene-Based Resin Layer (Air Permeability)]

A specimen having a full width of 80 mm in MD was collected from each of the manufactured polyolefin porous films. An intermediate polyethylene-based resin layer and polypropylene-based resin layers on both surfaces are exfoliated, and only the polyethylene-based resin layer was taken out. The Gurley values of the polyethylene-based resin layer were measured using a B type gurley densometer (manufactured by Toyo Seiki Seisaku-sho, Ltd.) in accordance with JIS P8117 as to three points which were the center and the right and left ends (50 mm inside from the end faces). The average value of three points was evaluated as the Gurley value of the polyethylene-based resin layer.

[Tear Test (Tear Resistance)]

A specimen having a full width of 200 mm in MD is collected from each of the manufactured polyolefin porous films. A specimen of MD 150 mm×TD 50 mm was produced, a 75 mm slit was made from the center, and a tear test was performed in accordance with the Trouser tear method in JIS K7128-1 as to three points which were the center and the right and left ends (50 mm inside from the end faces).

[Porosity of Polyolefin Porous Film]

Two specimens of 100 mm×100 mm were collected from both ends in the width direction of the polyolefin porous film along the both end faces using a mold. The weight of each of the collected two specimens was measured down to 0.1 mg. The porosity was calculated using the following expression from the measured weight.

Porosity (%)={(1−specimen weight $(g)$/density $(g/cm^3)$)/(specimen area $(100\ cm^2)$×film thickness (cm))}×100

Example 1

A polyethylene-based resin and a polypropylene-based resin having characteristic shown in Table 1 were used. The polypropylene-based resin and the polyethylene-based resin were coextruded using a coextruder provided with a multi-manifold T-die at a die temperature (coextruding temperature) of 210° C. so that a PE layer was an intermediate layer, and PP layers were formed on both the surfaces thereof, and a precursor film comprising a trilayer structure of PP layer/PE layer/PP layer was obtained. The thickness of each layer was adjusted so that the content of the polyethylene-based resin in the precursor film was 37% by mass.

The obtained precursor film was heat-treated in the temperature range of 130.2° C. to 135.7° C. for 30 minutes, and the heat-treated precursor film was next subjected to low temperature drawing in a cool drawing zone at 35° C. at a draw ratio (initial draw ratio) of 18%. The precursor film subjected to low temperature drawing was subjected to high temperature drawing in a hot drawing zone at 130° C. at a draw ratio (maximum draw ratio) of 190% and next subjected to thermal relaxation until the draw ratio (final draw ratio) was 125%. Then, heat setting was performed at a temperature of 133° C. to manufacture a polyolefin porous film. As to the manufactured polyolefin porous film, the Gurley value (total Gurley value) and the Gurley value of the PE layer were measured, and a tear test was performed. In the present example, the precursor film was drawn by an uniaxial drawing process in the machine direction (MD). Table 1 shows the results.

Examples 2 to 4 and Comparative Examples 1 to 3

Precursor films and polyolefin porous films were manufactured and evaluated in the same way except that polyethylene-based resins and polypropylene-based resins having the characteristics shown in Table 1 were used, respectively, and the contents of the polyethylene-based resins in the polyolefin porous films were shown in Table 1. Table 1 shows the results.

[Table 1]

TABLE 1

|  |  |  | Example 1 | Example 2 | Example 3 | Example 4 | Comparative Example 1 | Comparative Example 2 | Comparative Example 3 |
|---|---|---|---|---|---|---|---|---|---|
| Raw material for resin | Polypropylene-based resin | Weight average molecular weight (×10⁴) | 79 | 79 | 79 | 79 | 79 | 79 | 79 |
|  |  | Molecular weight distribution | 14.79 | 14.79 | 14.79 | 14.79 | 14.79 | 14.79 | 14.79 |
|  | Polyethylene-based resin | Weight average molecular weight (×10⁴) | 30 | 30 | 35 | 35 | 46 | 46 | 20 |
|  |  | Molecular weight distribution | 10.5 | 10.5 | 8.8 | 8.8 | 12.4 | 12.4 | 4.4 |
|  |  | Content of high molecular weight component having molecular weight of 1,000,000 or more (% by mass) | 6.5 | 6.5 | 7.9 | 7.9 | 11.5 | 11.5 | 1.5 |
|  |  | Melt flow rate (g/10 minutes) | 1.40 | 1.40 | 1.19 | 1.19 | 0.37 | 0.37 | 1.00 |
| Content of polyethylene-based resin in precursor film (% by mass) |  |  | 37 | 49 | 49 | 37 | 37 | 49 | 60 |
| Polyolefin porous film | Film thickness (μm) |  | 22.0 | 12.9 | 13.2 | 20.0 | 21.4 | 11.9 | 15.8 |
|  | Gurley value (total Gurley value) (second/100 cc) |  | 173 | 114 | 120 | 169 | 248 | 255 | ∞ |
|  | PE layer Gurley value (second/100 cc) |  | 5 | 5 | 13 | 7 | 60 | 112 | ∞ |
|  | PE layer Gurley value/total Gurley value × 100 (%) |  | 3 | 4 | 11 | 4 | 24 | 44 | ∞ |
|  | Tear resistance |  | 3/3 | 3/3 | 3/3 | 3/3 | 0/3 | 0/3 | Not measured |

In Table 1, "3/3" indicates that tears occurred at none of the three points among the three points in the tests, and "0/3" indicates that tears occurred at all of the three points among the three points in the tests (none of the three points were good) among the evaluation results of the tear test (tear resistance).

As shown in Table 1, according to Examples 1 to 4, the precursor films by coextrusion were obtained, and these were drawn and porosified using the polyethylene-based resins having the characteristics shown in Table 1, and the polyolefin porous films wherein the Gurley values were 230 seconds/100 cc or less, the polyolefin porous films were excellent in gas permeability, and the results of the tear tests were also good could be obtained. When the porosities were measured as to the polyolefin porous films obtained in Examples 1 to 4, all the porosities were in the range of 45 to 70%. It can be said from these results that the polyolefin porous films obtained in Examples 1 to 4 can be preferably used, for example, as separators for lithium ion batteries.

Meanwhile, in Comparative Examples 1 and 2 using the polyethylene-based resins wherein the contents of high molecular weight components having molecular weights of 1,000,000 or more were more than 11% by mass, in the obtained polyolefin porous films, the pore formation of the PE layers comprising the polyethylene-based resins did not proceed fully, resulting in high Gurley values and also inferior tear resistances.

In Comparative Example 3 using the polyethylene-based resin wherein the content of a high molecular weight component having a molecular weight of 1,000,000 or more was less than 2% by mass, in the obtained polyolefin porous film, the pore formation of the PE layer comprising the polyethylene-based resin did not proceed, the polyolefin porous film did not have open pores.

INDUSTRIAL APPLICABILITY

A polyolefin porous film of the present invention is preferably used as a separator for energy storage devices including lithium ion batteries, lithium ion capacitors and the like.

The invention claimed is:

1. A polyolefin porous film, comprising a polyethylene-based resin and a polypropylene-based resin,
the polyolefin porous film has a pair of polypropylene-based resin layers comprising the polypropylene-based resin on both surfaces of a polyethylene-based resin layer comprising the polyethylene-based resin,
the polyolefin porous film has a film thickness of 8 to 40 μm,
a Gurley value of the polyolefin porous film is 65 to 230 seconds/100cc,
a ratio of the Gurley value of the polyethylene-based resin layer to the Gurley value of the polyolefin porous film is 20% or less,
wherein a weight average molecular weight of the polyethylene-based resin is 450,000 or less,
a molecular weight distribution of the polyethylene-based resin is 6 to 13,
a content of a high molecular weight component having a molecular weight of 1,000,000 or more in the polyethylene-based resin is in a range of 5 to 11% by mass,
a melt flow rate of the polyethylene-based resin is in a range of 0.1 to 10 g/10 minutes, and
a weight average molecular weight of the polypropylene-based resin is 500,000 to 1,000,000.

2. The polyolefin porous film according to claim 1, wherein the melt flow rate of the polyethylene-based resin is in a range of 0.3 to 5 g/10 minutes.

3. The polyolefin porous film according to claim wherein the melt flow rate of the polyethylene-based resin is in a range of 0.6 to 3 g/10 minutes.

4. The polyolefin porous film according to claim 1, wherein the content of the high molecular weight component having a molecular weight of 1,000,000 or more in the polyethylene-based resin is in a range of 5 to 10% by mass.

5. The polyolefin porous film according to claim 1, wherein the content of the high molecular weight component having a molecular weight of 1,000,000 or more in the polyethylene-based resin is in a range of 6 to 9% by mass.

6. A separator for energy storage device, wherein the separator has the polyolefin porous film according to claim 1.

7. An energy storage device, comprising the separator for energy storage device according to claim 6, a cathode and an anode.

* * * * *